United States Patent [19]

Rockwood et al.

[11] Patent Number: 4,863,177
[45] Date of Patent: Sep. 5, 1989

[54] SPLIT LABYRINTH SEAL

[75] Inventors: Robert E. Rockwood, Windham; Richard P. Antkowiak, Hampstead, both of N.H.; John S. Pehl, Methuen, Mass.

[73] Assignee: A. W. Chesterton Co., Stoneham, Mass.

[21] Appl. No.: 140,460

[22] Filed: Jan. 4, 1988

[51] Int. Cl.[4] ............................................. F16J 15/00
[52] U.S. Cl. ..................................... 277/199; 277/53; 277/71; 277/79
[58] Field of Search ....................... 277/53, 54, 44, 55, 277/56, 57, 81 R, 81 S, 80, 148, 154, 155, 156, 190, 191, 192, 198, 199, 39, DIG. 3, 216, 217, 218, 219, 220, 221, 222, 223, 224

[56] References Cited

U.S. PATENT DOCUMENTS

| | | | |
|---|---|---|---|
| 808,082 | 12/1905 | Fuller | 277/44 |
| 1,544,609 | 7/1925 | Somes | 277/62 |
| 3,025,070 | 3/1962 | Copes | 277/39 |
| 3,101,200 | 8/1963 | Tracy | 277/93 |
| 3,337,224 | 8/1967 | Eser, Jr. et al. | 277/154 |
| 3,599,990 | 8/1971 | Greiner et al. | 277/4 |
| 4,022,479 | 5/1977 | Orlowski | 277/53 |
| 4,114,902 | 9/1978 | Orlowski | 277/53 |
| 4,353,559 | 10/1982 | Budzich et al. | 277/53 |
| 4,410,188 | 10/1983 | Copes et al. | 277/65 |
| 4,423,878 | 1/1984 | Escue | 277/1 |
| 4,572,517 | 2/1986 | Rockwood et al. | 277/53 |
| 4,576,384 | 3/1986 | Azibert | 277/81 |
| 4,580,793 | 4/1986 | Bronson | 277/199 |

FOREIGN PATENT DOCUMENTS

| | | | |
|---|---|---|---|
| 549572 | 4/1932 | Fed. Rep. of Germany | 47/24 |
| 941849 | 11/1963 | United Kingdom | 277/81 S |

Primary Examiner—William A. Cuchlinski, Jr.
Assistant Examiner—Jeffrey J. Hohenshell

[57] ABSTRACT

A split labyrinth seal comprises a stator and a rotor, each comprising a pair of halves. The rotor halves each comprise a hook and a further protrusion extending from the edge on one side of a central aperture and on the other side of the central aperture a recess in the edge for receiving the hook and the further protrusion. The hook and further protrusion and the recess to receive the same, each extend from adjacent the central aperture to the periphery of the half. The rotor halves are identical so that the hooks and protrusions of one half matingly engage the recess of the other half. The stator has a planar mounting wall and a peripheral wall extending axially to house the rotor therewithin. The edge of the stator on one side of the central aperture is recessed on the exterior side of the planar wall and on the other side of the central aperture is recessed on the interior side. The stator halves are identical at their edges, whereby the recessed edges overlap.

5 Claims, 2 Drawing Sheets

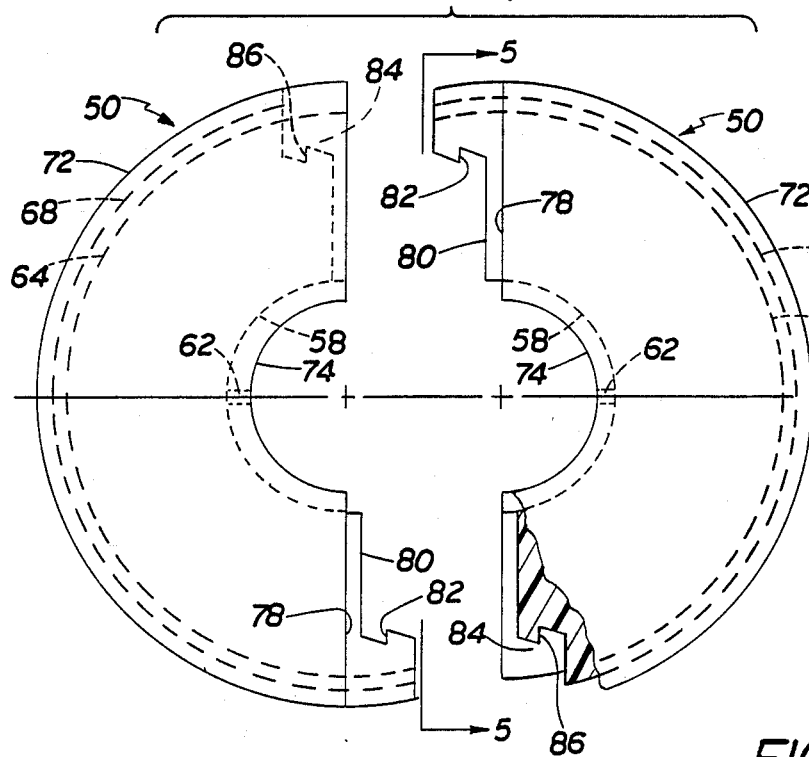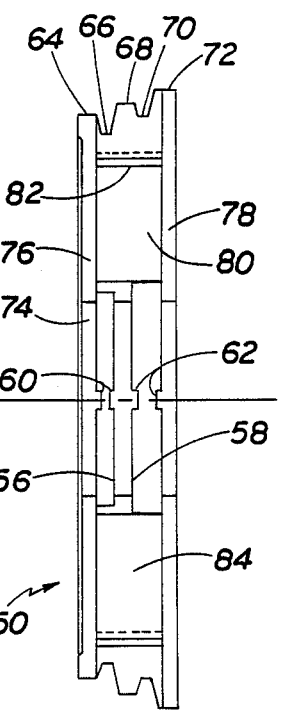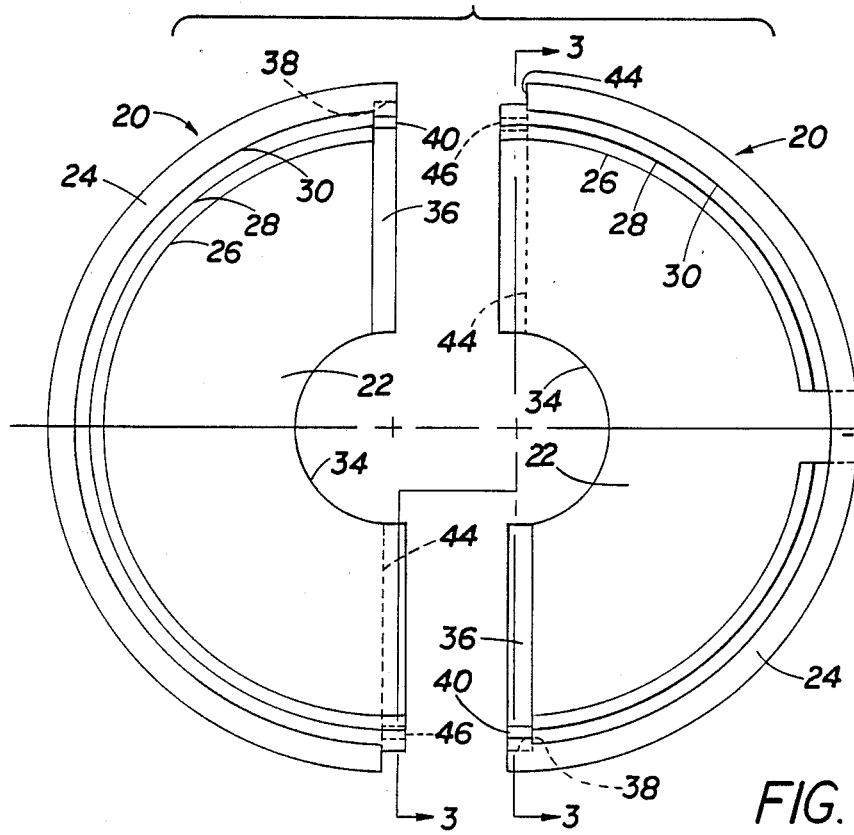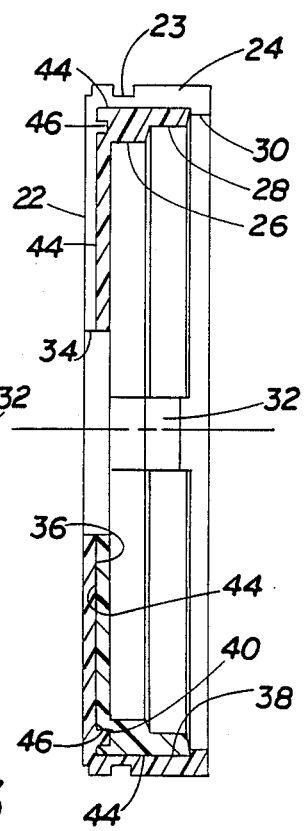

SPLIT LABYRINTH SEAL

This invention relates to labyrinth seals and, more particularly, to split labyrinth seals.

Labyrinth seals are utilized particularly to protect machine bearings from the intrusion of deleterious materials which shorten bearing life. Labyrinth seals, for example, are widely used to protect the bearings of industrial pumps. The bearings of electric motors, however, are often left essentially unprotected due to the expense of typical metal labyrinth seals. Additionally, although it is desirable to use split seals where feasible to permit assembly and disassembly of the seal about a shaft without the need for disassembling the machinery to which the shaft is connected, split seal halves are usually joined by threaded fasteners increasing the inconvenience and cost of employing the seals.

It is thus an object of this invention to provide a split labyrinth seal which is inexpensive to manufacture and simple to install and use, which avoids the use of extraneous parts and which remain sturdy in use.

In general the labyrinth seal of the invention features pairs of stator and rotor halves respectively provided with integral mating projections and recesses permitting joinder of the respective halves without the use of separate fasteners. In preferred embodiments, the stator and rotor halves are substantially identical and are made of injection molded plastic material whereby one half mold for the stator and one for the rotor can be utilized to manufacture both halves of the stator and the rotor.

In particular embodiments, each rotor half has a hook projecting from the edge of the rotor extending from one side of a central aperture in the rotor, adapted for positioning about a shaft, and the edge on the other side of the rotor central aperture comprises a recess for receiving the hook. The edges of the two halves extending from the central aperture are identical and the hooks mated in the recesses thereof are adapted to resist separation by forces acting in a direction normal to and in the plane of the rotor. In a preferred embodiment, a further protrusion extends along the edge from which the hook projects, extending from adjacent the central aperture to the hook; a corresponding recess is provided on the other edge. The hook and adjacent protrusion on one edge and the corresponding recess on the other edge are preferably spaced inwardly from the sides of the rotor halves along the edges.

The stator halves each comprise a planar wall extending outwardly from a central aperture in the stator and an axially extending peripheral wall adapted to house the rotor. The edge of the rotor half on one side of the central aperture is recessed on the exterior side and one the other side of the aperture is recessed on the interior side, thereby defining overlapping projections and recesses along the edge in adjacent stator halves. The peripheral wall at the edge recessed on the interior side of the planar wall is recessed in a generally U-shaped configuration and at the other edge is provided with a mating U-shaped projection. A rib is provided in the U-shaped recess mating with a recess in the U-shaped projection.

Other objects, features and advantages of this invention will be apparent to those skilled in the art from the following detailed description of a preferred embodiment thereof taken together with the accompanying drawings, in which:

FIG. 2 is an exploded plan view of the split halves of the stator of the seal illustrated in FIG. 1;

FIG. 3 is a sectional view of one stator half taken along the line 3—3 of FIG. 2, the lower portion of the stator half of FIG. 3 shown in section as assembled to the other stator half;

FIG. 4 is an exploded plan view of the split halves of the rotor of the seal illustrated in FIG. 1; and FIG. 5 is a view of one rotor half taken along the line 5—5 of FIG. 4.

Figure 1:
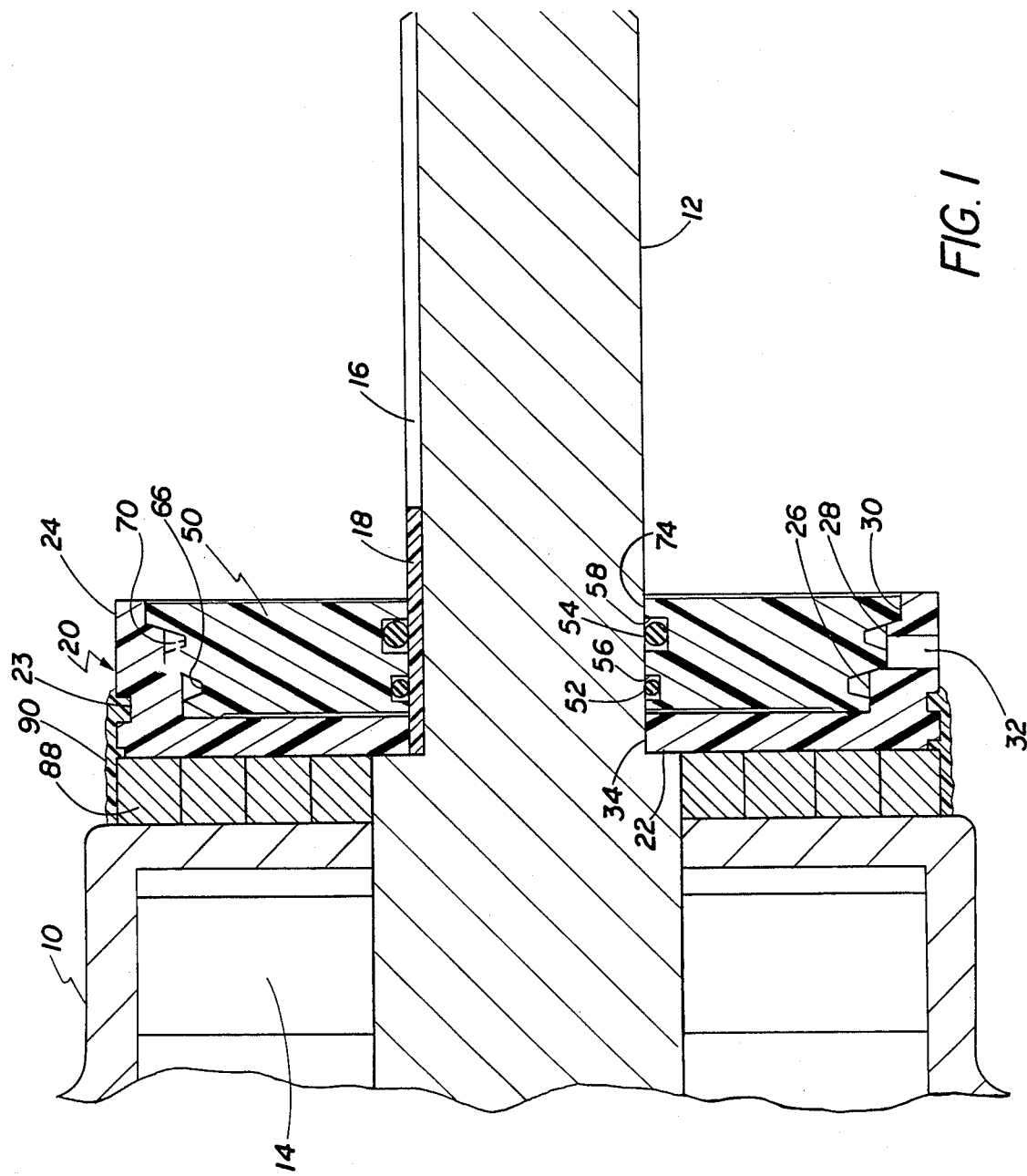
FIG. 1 is a side elevation in section of a labyrinth seal according to the invention assembled about a shaft to a housing.

As illustrated in FIG. 1, the labyrinth seal comprises a stationary sealing ring or stator 20 mounted about a shaft 12 and connected to the machine housing 10 to protect a bearing 14 in the housing. The seal also comprises a rotor 50 mounted on and connected to the shaft 12 by split O-rings 52,54 in grooves 56,58 extending about the inner periphery of the rotor.

The stator 20 is best shown in FIGS. 2 and 3. As shown, the stator comprises two essentially identical halves. Each half comprises a planar mounting wall 22 adapted for mounting the stator to a housing 10 or the like. Each half also comprises a peripheral wall 24 extending axially from planar wall 22 adapted to house rotor 50 therewithin. Within stator 20, peripheral wall 24 is provided with progressively greater diameters 26,28,30 in a direction away from planar wall 22. The reduced wall diameters 26,28 are interrupted midway about the periphery of one stator half and a drain hole aperture 32 is provided at the interrupted position of diameter 28 and through the peripheral wall 24 thereof.

The two halves of the stator 20 fit closely together as a mortise and tenon and are stable in relation to each due to the close fits. There is as much overlapping of material as possible to minimize leakage across the joints. Also to minimize leakage past the seal, the diameter of the central aperture 34 is preferably designed to be no more than about 0.005 to 0.008 inch larger than the shaft 12 about which it is mounted. As illustrated in FIGS. 2 and 3, the interior of the planar wall 22 is provided on one side of central aperture 34 along the edge thereof with a recess 36. Recess 36 joins a generally U-shaped recess 38 on the interior of peripheral wall 24 at the edge thereof. A rib 40 extends upwardly from the recessed wall 36 toward the recess 38. On the other side of central aperture 34, the planar wall 22 and peripheral wall 24 are recessed on the exterior 42,44 to provide a projecting configuration mating the internally recessed walls on the first side. A recess 46 is provided to receive rib 40. The closely mating configurations, shown particularly in the lower portion of FIG. 3, result in a structure, when the two halves are mated, which is relatively stable as a unitary stator.

The rotor 50 fits within stator peripheral wall 24 closely adjacent planar wall 22, as shown in FIG. 1. Like stator 20, rotor 50 comprises two identical halves. About the center of the halves is a central aperture 60. A pair of O-ring grooves 56,58 contain elastomeric O-ring halves therein as shown in FIG. 1. Preferably, bosses 60,62, shown in FIGS. 4 and 5, projecting from the sides of grooves 56,58, serve to retain the O-ring halves in the grooves 56,58. Alternatively, the O-ring grooves may be sufficiently narrow to retain the O-ring halves. The outer periphery of rotor 50 comprises a pair of grooves 66,70 defined between lands 64,68,72 which correspond to the internal diameters 26,28,30 of the peripheral wall 24 of stator 20.

Not only are the two halves of the rotor designed to fit closely together with as much overlapping of material as possible to minimize leakage across the joint, they are also provided with integral interlocking means to hold the halves together despite centrifugal forces as they rotate with shaft 12. In particular, as illustrated in FIGS. 4 and 5, on one side of central aperture 74, a central portion 80 between walls 76,78, protrudes beyond the edges of the walls 76,78 and at the radially outermost portion forms a hook having a surface 82 parallel to walls 76,78. On the other side of central aperture 74, a recess 84 corresponds to the configuration of central protrusion 80 and hook 82 and has a surface 86 parallel to walls 76,78 for engagement with the surface 82 of the hook. When the two halves are mated the hook surfaces 82 engaging surfaces 86 of the corresponding recesses resist separation by centrifugal force.

The stator 20 and the rotor 50 halves are each injection molded in half molds (not shown), one for the stator and one for the rotor. An insert, not shown, is placed in the stator mold to form the drain aperture 32 in one-half of the stator halves produced. The basic material employed for both the stator and the rotor is polyphenylene sulfide containing about 40% fiberglass fibers. The material is selected for its high temperature and chemical resistance. The rotor has added to the base material about 5% polytetrafluoroethylene and about 2% silicone for antifriction properties and to prevent galling if the rotor contacts the stator. Black coloring is also preferably added to the material for both the stator and the rotor.

In use, the exterior of the planar wall 22 of stator 20 is provided with acrylic pressure sensitive adhesive with a protective paper cover (not shown). In certain applications, where there is no interfering structure, the housing 10 about the shaft 12 is cleaned with appropriate solvent, such as 111 trichlorethylene, as is any keyway 16 in shaft 12. If a keyway 16 is provided a filler strip 18 of Buna foam having paper covered acrylic pressure sensitive adhesive (not shown) on one side is first placed in the keyway 16, the paper covering first being removed and with the adhesive against the keyway base to hold it in place. Filler strip 18 is located at the position where the labyrinth seal will be placed in order to fill the keyway thereby to prevent passage of contaminants therealong and to prevent damage to the O-ring halves 52,54 mounted in the rotor where they extend across the keyway. The stator halves 20 are then assembled together about the shaft with drain 32 in the lowermost position, the paper covering the adhesive on the exterior of planar wall 22 is removed and the stator is contacted against the housing, the adhesive securing the stator in place. The rotor is then assembled about the shaft with the hooks engaged in recesses. The rotor is moved along the shaft until it is completely within the stator.

If, as shown in FIG. 1, a step in the shaft 12 prevents mounting the stator 20 directly to the housing 10, a plurality of split rings 88 are provided which may be adhesively secured to the housing 10 about shaft 12 and to which the stator is then adhesively secured. The rings 88 are preferably made of polyphenylene sulfide with fiberglass, i.e., the material as the stator. The rings are thus sufficiently flexible while having the same temperature and chemical resistance as the labyrinth seal.

After the stator 20 is mounted, with or without rings 88, a steel reinforced epoxy putty 90, such as that sold under the name "Quiksteel" by Polymeric Systems, Inc., of Phoenixville, Pennsylvania, is applied between the housing 10 and the groove 23 in the exterior of peripheral wall 24. The epoxy seals the joint and further serves to lock the stator in position.

In an alternate embodiment, not shown, an O-ring can be placed in groove 90 and the stator inserted into an opening of the same external diameter as the stator.

Other embodiments of this invention will occur to those skilled in the art which are within the scope of the following claims.

What is claimed is:

1. In a split labyrinth seal comprising a stator and a rotor extending generally in a plane, said stator comprising a pair of stator halves and said rotor comprising a pair of rotor halves, the improvement in which said rotor halves are provided with integral mating projections and recesses on their respective adjacent edges whereby said rotor halves may be joined together without the use of separate fasteners, each rotor half comprising a hook and a further protrusion projecting from said edge thereof on one side of a central aperture portion thereof, adapted for positioning about a shaft, and in said edge on the other side of said central aperture of said rotor comprising a recess for receiving said hook and said further protrusions, said hook and said further protrusion on one side of said central aperture and said recess on the other side of said central aperture extending from said edge from adjacent said central aperture to the outer periphery of said rotor, the edges of said rotor halves being identical and said hooks of said halves positioned in said recesses adapted to resist separation by forces acting in a direction normal to and in the plane of said rotor.

2. The improvement claimed in claim 1 in which said hook and protrusion are spaced inwardly from both sides of said edge from which they project and said recess is positioned between the sides of said edge in which said recess is located.

3. The improvement claimed in either one of the preceding claims in which each stator half comprises a planar mounting wall extending outwardly from a central aperture of said stator and a peripheral wall extending axially from the planar wall adapted to house the rotor therewithin; each said stator half having an edge extending on each side of said stator central aperture, said edge on one side of said stator central aperture being recessed on one side of said planar wall opposite the side from which said peripheral wall extends and said edge on the other side of said stator central aperture being recessed on the other side of said planar wall from which said peripheral wall extends, said stator halves being identical at their edges whereby the recessed edges thereof overlap.

4. The improvement claimed in claim 3 in which said peripheral wall has a generally U-shaped internal recess at one end edge adjacent and connecting with said recess on said other side of said planar wall and said peripheral wall at the other end edge thereof has a projection matching the U-shaped internal recess on the one end edge.

5. The improvement claimed in claim 4 in which said U-shaped internal recess includes a rib extending axially from said recess on said other side of said planar wall and said recess at the other end edge includes a recess matching said rib.

* * * * *

UNITED STATES PATENT AND TRADEMARK OFFICE
CERTIFICATE OF CORRECTION

PATENT NO.   : 4,863,177

DATED        : September 5, 1989

INVENTOR(S)  : Robert E. Rockwood, Richard P. Antkowiak and John S. Pehl

It is certified that error appears in the above-identified patent and that said Letters Patent is hereby corrected as shown below:

Column 1, line 54, delete "one" and insert therefor --on--.

Column 2, line 36, after "each" insert --other--.

Column 4:

Claim 1, line 27, delete "protrusions" and insert therefore --protrusion--.

Signed and Sealed this

Second Day of March, 1993

Attest:

STEPHEN G. KUNIN

*Attesting Officer*   *Acting Commissioner of Patents and Trademarks*